(12) United States Patent
Barthel et al.

(10) Patent No.: US 11,781,690 B2
(45) Date of Patent: Oct. 10, 2023

(54) CONNECTOR

(71) Applicant: TI Automotive (Fuldabrueck) GmbH, Fuldabrueck (DE)

(72) Inventors: Iris Barthel, Schaunburg (DE); Kay Bube, Schenklengsfeld (DE); Reiner Rohde, Malsfeld (DE); Harald Knobloch, Heidelberg (DE); Seong-hwa Choo, Incheon (KR); Jeong-ho Lim, Incheon (KR); Dong-hyeok Lee, Gyeonggi-do (KR); Sung-yong Eom, Incheon (KR)

(73) Assignee: TI AUTOMOTIVE (FULDABRUECK) GMBH, Fuldabrueck (DE)

( * ) Notice: Subject to any disclaimer, the term of this patent is extended or adjusted under 35 U.S.C. 154(b) by 58 days.

(21) Appl. No.: 17/324,662

(22) Filed: May 19, 2021

(65) Prior Publication Data
US 2021/0364112 A1     Nov. 25, 2021

(30) Foreign Application Priority Data

May 19, 2020  (EP) .................................. 20175417

(51) Int. Cl.
F16L 37/098         (2006.01)

(52) U.S. Cl.
CPC ....... F16L 37/0985 (2013.01); *F16L 2201/10* (2013.01)

(58) Field of Classification Search
CPC ... F16L 37/0985; F16L 37/144; F16L 37/142; F16L 2201/10

USPC .......................................................... 285/93
See application file for complete search history.

(56) References Cited

U.S. PATENT DOCUMENTS

2019/0242508 A1*  8/2019  Gaurat .................. F16L 37/088

FOREIGN PATENT DOCUMENTS

| | | |
|---|---|---|
| CN | 101876387 A | 11/2010 |
| CN | 103124874 A | 5/2013 |
| CN | 105090641 A | 11/2015 |
| CN | 109477604 A | 3/2019 |
| CN | 110135109 A | 8/2019 |
| CN | 110709637 A | 1/2020 |
| CN | 111033108 A | 4/2020 |
| DE | 202012102296 U1 | 9/2012 |
| DE | 102019204343 A1 | 8/2019 |
| EP | 1770321 | 4/2007 |
| EP | 1770321 A1 | 4/2007 |
| WO | 2019036233 A1 | 2/2019 |

* cited by examiner

*Primary Examiner* — Aaron M Dunwoody
(74) *Attorney, Agent, or Firm* — Dickinson Wright PLLC

(57) ABSTRACT

A connector for connecting two fluid-conducting elements, in particular for connecting two motor vehicle pipelines, with a female plug-in part and a male plug-in part that can be plugged into the female plug-in part. The male plug-in part can be fixed on the female plug-in part via at least one fixing element. At least one indicator element is provided, which indicates the properly or completely fixed state of the male plug-in part which has been reached via the fixing element. When the male plug-in part is inserted into the female plug-in part, the indicator element is displaced outward in the radial direction. A radial outer position of the indicator element shows the properly fixed state of the male plug-in part on the female plug-in part.

20 Claims, 4 Drawing Sheets

CONNECTOR

RELATED APPLICATIONS

The present disclosure is a national phase application of European Application 20175417.3, filed on May 19, 2020, the entire contents of each of which are incorporated herein by reference.

FIELD

The disclosure relates to a connector for connecting two fluid-conducting elements, in particular for connecting two motor vehicle pipelines, —with a female plug-in part and a male plug-in part that can be plugged into the female plug-in part, wherein the male plug-in part can be fixed on the female plug-in part via at least one fixing element. Basically, the connector according to the disclosure can have different designs and it can in particular be a so-called VDA connector or so-called SAE connector. It is within the scope of the disclosure that the connector according to the disclosure is a rapid connector or quick connector.

BACKGROUND

Connectors of the type described above are known from practice in various configurations. Especially when these connectors are used to connect two motor vehicle pipelines, a correct and functionally reliable connection between the male plug-in part and the female plug-in part must be guaranteed. In this context problems do not infrequently occur. Many of the known connectors have the disadvantage that the correct and functionally reliable connection between the male and female plug-in part is not easily ascertainable. Various detection systems already exist, all of which aim to clearly indicate the correct connection between male and female plug-in parts. However, many of these known detection measures can be realized only with relatively expensive or costly manufacturing efforts. For example, it is known to use relatively expensive electrical detection components. In this respect there is a need for improvement.

BRIEF SUMMARY

In view of this, the disclosure is based on the technical problem of specifying a connector of the type described at the outset, in which the correct connection between the male plug-in part and the female plug-in part can be displayed in a clear and functionally reliable way, and in which the detection measures can be implemented in a simple and inexpensive manner.

To solve this technical problem, the disclosure teaches a connector for connecting two fluid-conducting elements, in particular for connecting two motor vehicle pipelines, —with a female plug-in part and a male plug-in part that can be plugged into the female plug-in part, wherein the male plug-in part can be fixed on the female plug-in part via at least one fixing element, at least one indicator element being provided, which indicates the properly or completely fixed state of the male plug-in part on the female plug-in part reached via the fixing element, wherein the indicator element is displaced outward in the radial direction when the male plug-in part is inserted into the female plug-in part and wherein at least one radial outer position of the indicator element indicates the properly fixed state of the male plug-in part on the female plug-in part. It is within the scope of the disclosure that the indicator element is displaced outward in the radial direction by means of the collar when the male plug-in part is inserted into the female plug-in part.

According to a preferred embodiment of the disclosure, the female plug-in part and/or the male plug-in part consists of at least one plastic or substantially of at least one plastic. Suitable plastics to be considered for the male plug-in part and/or for the female plug-in part are in particular polyamides, or also polyphenylene sulfide (PPS). In principle, plastics other than the material for the male plug-in part and/or the female plug-in part are also within the scope of the invention, for example polyolefins such as polypropylene and/or polyurethane. It is also possible that the male plug-in part and the female plug-in part are made from different plastics.

A particularly preferred embodiment of the disclosure is thereby characterized in that a retainer is connected to the female plug-in part as a fixing element, with which the male plug-in part can be fixed in the inserted state on the female plug-in part. For this purpose, the female plug-in part expediently has at least one recess, preferably two opposing recesses, each of which is/are penetrated by the retainer, so that the retainer can act on the male plug-in part. In the fully inserted or fixed state of the male plug-in part, the retainer preferably engages behind a stop flange of the male plug-in part and the retainer very preferably engages in a fixing groove of the male plug-in part. The retainer expediently consists of a metal, in particular a metal wire or substantially a metal, in particular a metal wire. It has been proven successful for the retainer to be made of steel, in particular of steel wire or substantially of steel, in particular of steel wire. In principle, however, the retainer can also consist of plastic.

A particularly proven embodiment of the disclosure is characterized in that the retainer is U-shaped with a U-bracket and two U-legs connected to the U-bracket. It is recommended that the female plug-in part has two opposing recesses, which are penetrated by the U-legs of the retainer, so that the U-legs can act on the male plug-in part. The U-legs expediently engage behind the stop flange of the male plug-in part in the fixed state of the male plug-in part on the female plug-in part, and particularly preferably the U-legs engage in a fixing groove of the male plug-in part. It is recommended that the two U-legs are connected to the U-bracket in a resilient manner. —It is within the scope of the invention that the two U-legs of the retainer are pressed radially outward when the male plug-in part is inserted into the female plug-in part by an—expediently circumferential—collar or projection arranged on the outer surface of the male plug-in part, in particular by the stop flange, in order to subsequently engage behind the circumferential collar or projection, in particular the stop flange of the male plug-in part during the further insertion of the male plug-in part into the female plug-in part. Then the male plug-in part is completely or properly fixed on the female plug-in part.

It is within the scope of the invention that on the male plug-in part—preferably completely encircling the circumference of the male plug-in part—a collar is provided, the side surfaces of which extend substantially vertically or at right angles to the surface of the male plug-in part. The collar of the male plug-in part is expediently engaged from behind by the retainer in the fixed state of the male plug-in part and thus forms the stop flange of the male plug-in part or includes the stop flange of the male plug-in part.

According to a particularly preferred embodiment of the disclosure, the indicator element according to the disclosure slides when the male plug-in part is inserted into the female plug-in part via a ramp and is displaced outward in the radial direction. It is within the scope of the disclosure that this ramp is provided on the outer surface of the male plug-in part and preferably the ramp is integrally molded to the male plug-in part. Furthermore, it is within the scope of the invention that the ramp increases in the axial direction of the male plug-in part and preferably increases against the direction of insertion of the male plug-in part into the female plug-in part. The ramp expediently increases continuously and in particular step-free. It has been proven to be successful for the ramp to increase by 15 to 45°, preferably by 20 to 35°. According to a recommended embodiment of the disclosure, the ramp runs around the circumference of the male plug-in part by at least 50%, in particular by at least 60%, preferably by at least 75% and more preferably by at least 90%. A very particularly preferred embodiment of the disclosure is distinguished in that the ramp runs completely around the circumference of the male plug-in part.

In principle, the ramp according to the disclosure can be a component or preferably a one-piece molded component on the male plug-in part that otherwise fulfills no function in relation to the connection between the two plug-in parts and is only provided for the indicator element according to the disclosure. According to a preferred embodiment of the disclosure, the ramp has the stop flange for the retainer or the ramp forms the stop flange for the retainer. This embodiment has proven itself within the scope of the invention. A particularly preferred embodiment of the disclosure is characterized in that the ramp fulfills several functions, namely on the one hand the function of the projection which presses the U-bracket of the retainer radially outward when the male plug-in part is inserted, and on the other hand by the function of the stop flange, which the U-bracket of the retainer engages behind when the male plug-in part is pushed further into the female plug-in part, and also the function of the ramp for the indicator element. This embodiment has been proven particularly useful in the context of the disclosure.

The indicator element according to the disclosure expediently consists of plastic or substantially of plastic. The indicator element is preferably a one-piece element, preferably a one-piece plastic element. It is within the scope of the disclosure that the indicator element is provided on the female plug-in part and the indicator element preferably passes through an indicator opening in the wall of the female plug-in part. According to a recommended embodiment of the disclosure, the indicator element is fixed in the wall of the female plug-in part prior to the insertion of the male plug-in part into the female plug-in part and, in particular, latched into the wall of the female plug-in part, preferably only slightly latched. It goes without saying that the indicator element is fixed or latched into the wall of the female plug-in part with the proviso that the indicator element according to the disclosure can be displaced outward in the radial direction when the male plug-in part is inserted. In this respect, the fixation or latching of the indicator element when the male plug-in part is pushed into the female plug-in part is, as it were, released for the radial displacement of the indicator element.

According to the disclosure, the indicator element slides over the ramp and is displaced outward in the radial direction when the male plug-in part is inserted into the female plug-in part. It is within the scope of the invention that the indicator element is displaced radially outward when sliding over the ramp through the indicator opening of the female plug-in part. According to the disclosure, the radial displacement of the indicator element takes place until a radial outer position of the indicator element is reached and this radial outer position of the indicator element shows the correct or completely fixed state of the male plug-in part on the female plug-in part. It is within the scope of the invention that the indicator element, in its radial outer position, protrudes radially outward by an indicator section. The indicator element expediently protrudes from the indicator opening of the female plug-in part by the indicator section. This position or radial outer position of the indicator element indicates the properly or completely fixed state of the male plug-in part on the female plug-in part.

It is also within the scope of the invention that the indicator element located in the radial outer position can be returned or pushed back into its starting position when the male plug-in part is not inserted or after the male plug-in part has been removed from the female plug-in part. The indicator element can then expediently be returned or pushed back into its fixed or locked state in the wall of the female plug-in part.

According to one embodiment of the disclosure a section of the retainer—in particular the U-bracket of the retainer or a section of the U-bracket of the retainer—is arranged, in the fixed state of the male plug-in part and in the radial outer position of the indicator element, between the protruding indicator section of the indicator element and at least one flange segment protruding from the outer surface of the female plug-in part. In this way, the retainer can also be stabilized or fixed in its position.

According to one embodiment of the disclosure, at least two and preferably two indicator elements are present. The two indicator elements are expediently provided on the female plug-in part and they each preferably pass through an indicator opening in the wall of the female plug-in part. It is within the scope of the invention that for the at least two or for the two indicator elements, all of the embodiments described above for the indicator element can be implemented alternatively, in partial combination or in combination.

It is recommended that an indicator element has at least one indicator foot, with which the indicator element slides on the ramp or on the ascending ramp. According to a particularly preferred embodiment of the disclosure, an indicator element has at least two and preferably two indicator feet, with which the indicator element slides on the ascending ramp. The indicator feet or the two indicator feet are preferably each connected to an indicator leg of the indicator element. The two indicator legs are expediently arranged parallel or substantially parallel to one another. It is recommended that the indicator legs are connected to an indicator base of the indicator element, the indicator base preferably having the indicator section or forming the indicator section, which indicates the completely or properly connected state of the male plug-in part in the radial outer position of the indicator element.

It is recommended that the indicator legs are resiliently connected to the indicator base, so that the indicator legs can be moved toward or away from one another by the action of force. Expediently a latching element (each) is connected to at least one indicator leg and is preferably connected to both indicator legs. When the male plug-in part is not yet pushed in, the indicator element can be held or latched in the wall of the female plug-in part via this latching element or via these latching elements. When the male plug-in part is pushed in, the latching can then be released, in particular due to the preferably provided resilient design of the indicator legs, and the indicator element can be displaced radially outward.

It has been shown that, according to a preferred embodiment, an indicator element has at least one indicator foot, with which the indicator element can slide on the ramp. According to one embodiment of the disclosure, an indicator foot of the indicator element is designed to be slanted in accordance with the angle of incline of the ramp.

The disclosure is based on the knowledge that a properly or completely fixed state of the male plug-in part on the female plug-in part can be displayed in a clear and functionally reliable way with the connector according to the disclosure. The indicator element according to the disclosure serves for this, and can moreover, according to a recommended embodiment of the disclosure, have a special color that differs from the color of the other components of the connector, and in particular from the color of the female plug-in part. The display of the properly or completely fixed state of the male plug-in part is possible without malfunctions or constraints. It should also be emphasized that the indication or detection measures according to the disclosure can be implemented in a very simple and inexpensive manner. Above all, the construction or design of the previously known connector does not have to be significantly changed. Therefore, the measures according to the disclosure are associated with a low manufacturing effort and low manufacturing costs. The cost of materials for implementing the indication measures according to the disclosure is also relatively low. The implementation of the measures according to the disclosure is above all in accordance with the relevant standards for such connectors. It should also be mentioned that the indicator element according to the disclosure can also be used as an information carrier for barcodes or the like.

BRIEF DESCRIPTION OF THE DRAWINGS

The disclosure is described below in more detail with reference to a drawing showing just one exemplary embodiment. In a schematic illustration.

DETAILED DESCRIPTION

Figure 1:
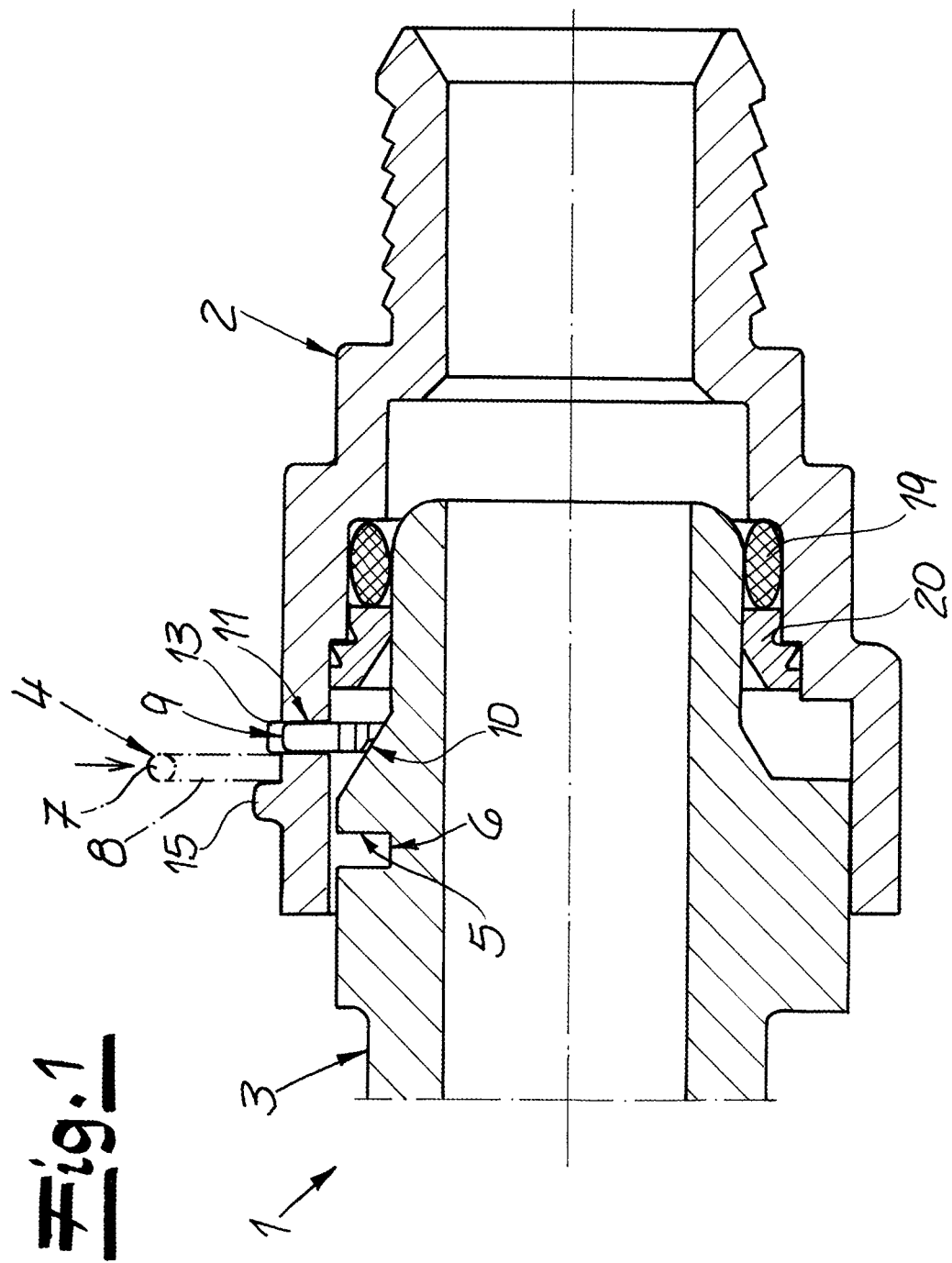
FIG. 1 shows a longitudinal section through the connector according to the disclosure in a first functional position.
Figure 2:
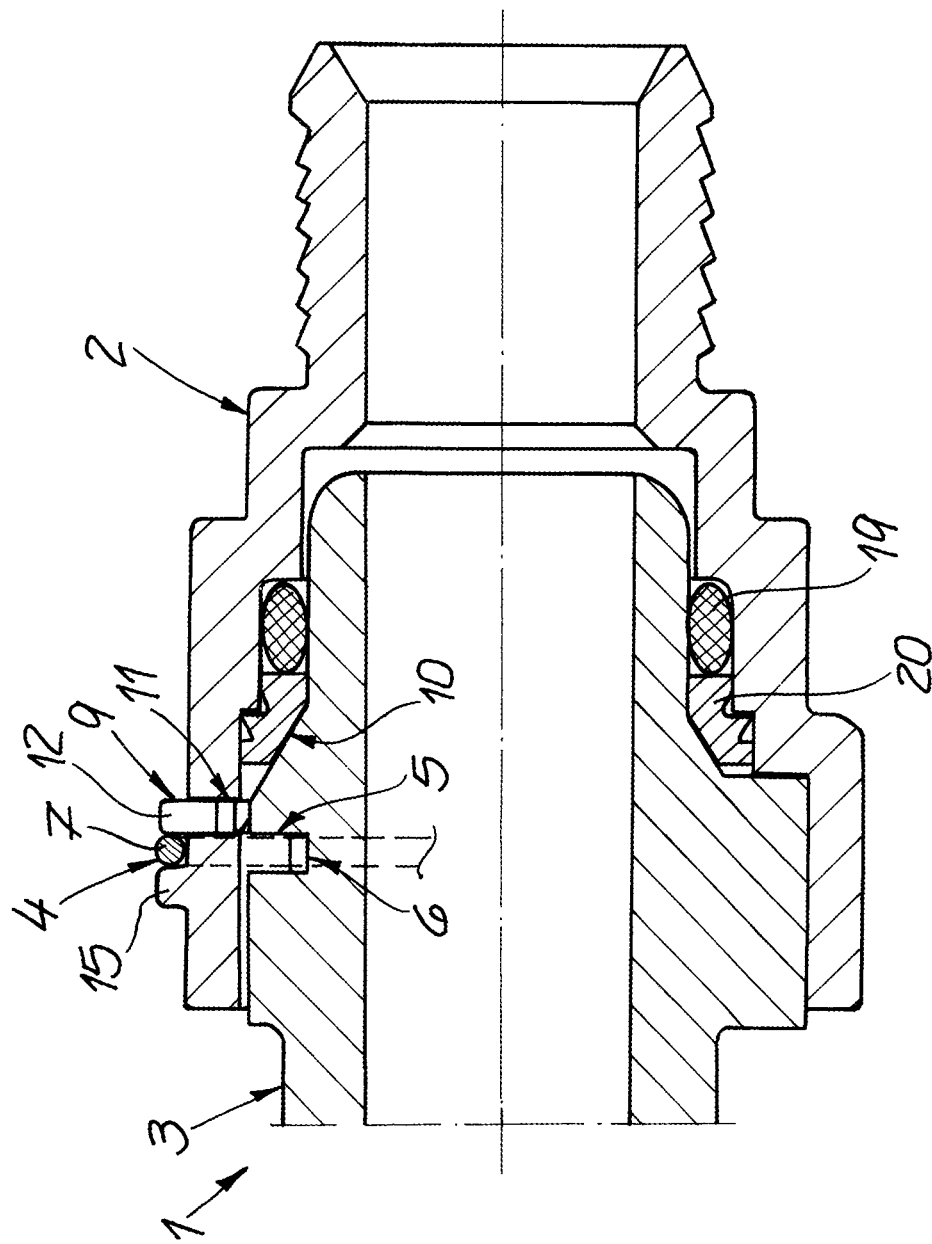
FIG. 2 shows the object according to FIG. 1 in a second functional position.
Figure 5:
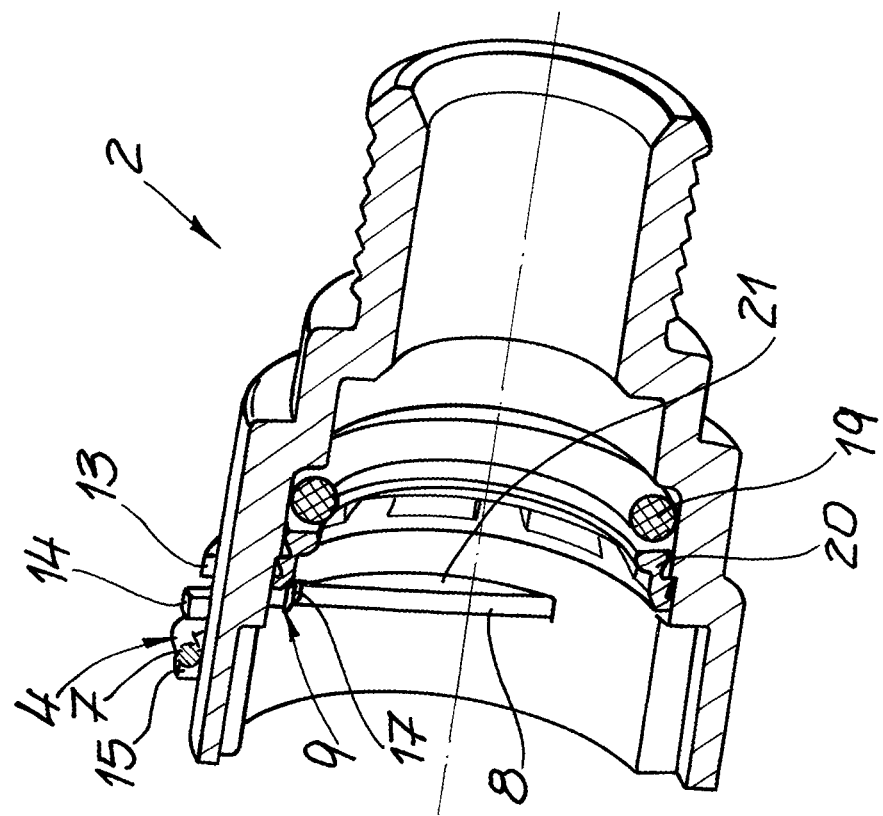
FIG. 5 is a perspective view of the female male plug-in part of the connector with the retainer received.

The figures show a connector 1 for connecting two fluid-conducting elements, in particular for connecting two motor vehicle pipelines not shown in the exemplary embodiment in more detail. The connector 1 has a female plug-in part 2 and a male plug-in part 3 that can be plugged into the female plug-in part 2. According to a preferred embodiment, the connector shown in the Figures is a so-called VDA connector. The male plug-in part 3 is fixed on the female plug-in part 2 via a fixing element when it is completely inserted into the female plug-in part 2. The fixing element is preferably, and in the exemplary embodiment, a U-shaped retainer 4 which is expediently connected to the female plug-in part 2 and passes through two opposite slot-shaped recesses 21 of the female plug-in part 2 (FIG. 5). Preferably, and in the exemplary embodiment, the retainer 4 engages behind a stop flange 5 of the male plug-in part 3 when the male plug-in part 3 is completely or properly inserted. Preferably, and in the exemplary embodiment, the retainer 4 engages in a fixing groove 6 of the male plug-in part 3 (FIG. 2). As recommended and as in the exemplary embodiment according to the Figures, the U-shaped retainer 4 is equipped with a U-bracket 7 and two U-legs 8 connected to the U-bracket 7. Each U-leg 8 preferably extends through one of the two opposite slot-shaped recesses 21 of the female plug-in part 2 (FIG. 5). Expediently and in the exemplary embodiment, the two U-legs 8 engage behind the stop flange 5 of the male plug-in part 3 and engage in a fixing groove 6 of the male plug-in part 3 when the male plug-in part 3 is completely fixed.

Figure 4:
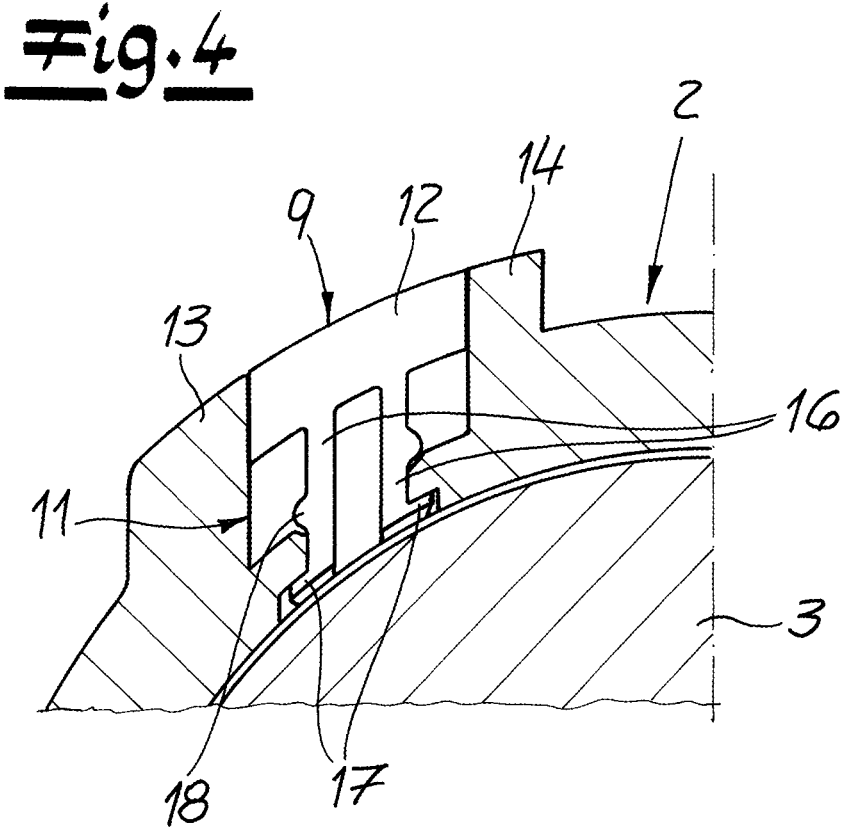
FIG. 4 shows the object according to FIG. 3 in the second functional position.

According to the disclosure an indicator element 9 is provided, which indicates the properly or completely fixed state of the male plug-in part 3 on the female plug-in part 2, which has been reached via the fixing element or via the retainer 4. When the male plug-in part 3 is inserted into the female plug-in part 2, the indicator element 9 slides over a ramp 10. It is shifted outward in the radial direction here, and a radial outer position of the indicator element 9 finally indicates the properly fixed state of the male plug-in part 3 on the female plug-in part 2 (FIGS. 2 and 4).

Preferably, and in the exemplary embodiment according to the figures, the ramp 10 is provided on the outer surface of the male plug-in part 3, and the ramp 10 is recommended to be formed in one piece on the male plug-in part 3. Preferably, and in the exemplary embodiment, the ramp 10 increases in the axial direction of the female plug-in part 2 or in the axial direction of the male plug-in part 3, specifically preferably, and in the exemplary embodiment, against the insertion direction of the male plug-in part 3. It is within the scope of the invention that the ramp 10 increases continuously and step-free and preferably increases by 15° to 45°. In the exemplary embodiment, the ramp 10 increases 10 by about 25°. Expediently, and in the exemplary embodiment, the ramp 10 runs around the entire circumference of the male plug-in part 3.

The Figures show a particularly preferred embodiment of the disclosure, in which the ramp 10 also forms or includes the stop flange 5 for the retainer 4. When the male plug-in part 3 is completely or properly inserted into the female plug-in part 2, the U-legs 8 of the retainer 4 preferably, and in the exemplary embodiment, engage behind the stop flange 5 of the ramp 10, which is also responsible for the radial displacement of the indicator element 9.

It is within the scope of the invention that the indicator element 9 is provided on the female plug-in part 2 and preferably, and in the exemplary embodiment, extends through an indicator opening 11 in the wall of the female plug-in part 2. Expediently, and in the exemplary embodiment, the indicator element 9 is displaced radially outward when sliding over the ramp 10 through the indicator opening 11 of the female plug-in part 2. According to the proven embodiment and in the exemplary embodiment, the indicator element 9 protrudes, in its radial outer position, by an indicator section 12 to the outside (see FIGS. 2 and 4). In the exemplary embodiment, the indicator element 9 protrudes by the indicator section 12 from the indicator opening 11.

The male plug-in part 3 is preferably, and in the exemplary embodiment, connected to the female plug-in part 2 as follows: When the male plug-in part 3 is pushed into the female plug-in part 2, the two U-legs 8 of the retainer 4 (FIG. 5) are first pressed outward by the ramp 10 of the male plug-in part 3. At the same time, the indicator element 9 slides over the ramp 10 and is displaced radially outward in the process. Finally, the U-legs 8 engage behind the stop flange 5 of the ramp 10 and preferably engage the fixing groove 6. In this properly or completely fixed state of the male plug-in part 3 on the female plug-in part 2, the indicator element 9 is in its radial outer position and the indicator element 9 expediently protrudes with its indicator section 12 through the indicator opening 11 of the female plug-in part 2 (FIGS. 2 and 4).

Figure 3:
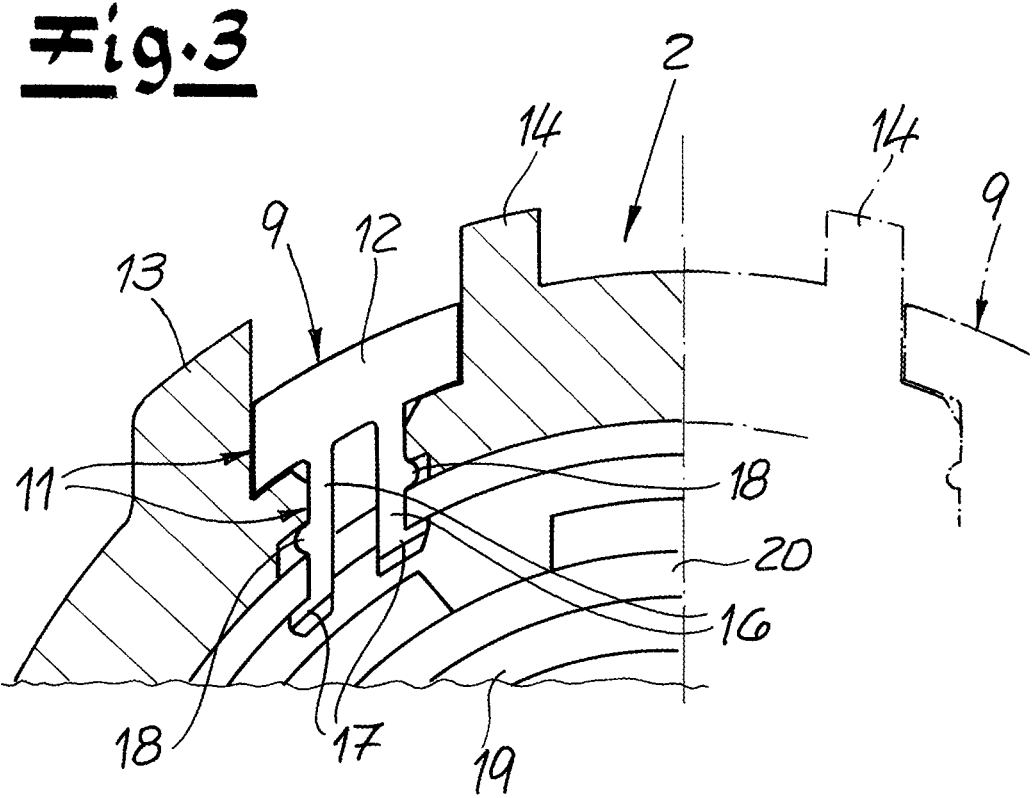
FIG. 3 shows a cross section through the connector in the first functional position according to FIG. 1 in the area of the indicator element.

Preferably, and in the exemplary embodiment (see in particular FIGS. 3 and 4), the indicator section 12 is guided by two guide lugs 13, 14 arranged in the circumferential direction of the female plug-in part 2 next to the indicator section 12 during the radial displacement of the indicator element 9. The indicator section 12 is expediently received in a form-fitting manner between the two guide lugs 13, 14. Preferably, and in the exemplary embodiment, the surface of the indicator element 9 or of the indicator sections 12 closes, in the radial outer position of the indicator element 9, flush with the surfaces of the guide lugs 13, 14 (FIG. 4).

According to recommended embodiments of the disclosure, and in the embodiment, a section of the U-bracket 7 of the U-shaped retainer 4 is arranged in the fixed state of the male plug-in part 3 or in the radial outer position of the indicator element 9 between the protruding indicator section 12 of the indicator element 9 and a flange segment 15 protruding from the surface of the female plug-in part. It is within the scope of the invention that the flange segment 15 is integrally formed on the female plug-in part 2. Furthermore, it is within the scope of the invention that the guide lugs 13, 14 are integrally formed on the female plug-in part 2.

A preferred embodiment of the disclosure is characterized in that two indicator elements 9 are present, which are expediently arranged next to one another in the circumferential direction of the female plug-in part 2. Each of the two indicator elements 9 preferably passes through an indicator opening 11 in the wall of the female plug-in part 2.

Preferably, and in the exemplary embodiment, an indicator element 9 has two indicator legs 16, preferably parallel to one another, with an indicator foot 17 being connected to the lower end of each indicator leg 16. The two indicator legs 16 open at their top into the indicator section 12 of the indicator element 9. Preferably, and in the exemplary embodiment, a latching cam 18 is provided on each indicator leg 16 of the indicator element 9, via which the respective indicator leg 16 is (slightly) latched in the wall of the female plug-in part 2 when the male plug-in part 3 is not yet fixed. When inserting the male plug-in part 3 into the female plug-in part 2, and when the ramp 10 acts on the indicator element 9, the indicator element is released from the latching on the female plug-in part 2 and, according to the disclosure, displaced radially outward. It is also within the scope of the invention that the indicator feet 17 of an indicator element 9 are slanted in accordance with the angle of incline of the ramp 10.

In the Figures it can also be seen that, according to a preferred embodiment, a sealing ring 19 is arranged in the female plug-in part 2 in a conventional manner, which is preferably held in the female plug-in part 2 by a spacer ring 20 in the exemplary embodiment.

The invention claimed is:

1. A connector for connecting two fluid-conducting elements with a female plug-in part and a male plug-in part that can be plugged into the female plug-in part in an axial direction, wherein the male plug-in part can be fixed on the female plug-in part via at least one fixing element comprising a retainer configured for connection to the female plug-in part with which the male plug-in part can be fixed in a properly fixed state on the female plug-in part, wherein an indicator element is provided, the indicator element being a unitary piece which shows the properly fixed state of the male plug-in part, which has been reached via the fixing element on the female plug-in part, wherein an outer surface of the male plug-in part includes a ramp configured such that the indicator element is guided over the ramp and displaced outward in the radial direction when the male plug-in part is inserted into the female plug-in part, and wherein at least one radial outer position of the indicator element indicates the properly fixed state of the male plug-in part on the female plug-in part, the indicator element projecting radially outward from the female plug-in part such that the indicator element is visible to provide optical verification of the properly fixed state.

2. The connector according to claim 1, wherein the retainer engages in a fixing groove behind a stop flange of the male plug-in part, when the male plug-in part is in the properly fixed state.

3. The connector according to claim 2, wherein the retainer is formed U-shaped with a U-bracket and two U-legs connected to the U-bracket, and wherein the U-legs expediently engage, in the fixed state of the male plug-in part on the female plug-in part, behind the stop flange of the male plug-in part and in a fixing groove of the male plug-in part.

4. The connector according to claim 1, wherein the ramp is integrally formed on the male plug-in part.

5. The connector according to claim 1, wherein the ramp increases in the axial direction of the female plug-in part or the male plug-in part and faces an insertion direction of the male plug-in part.

6. The connector according to claim 1, wherein the ramp increases continuously, step-free, and by 15° to 45° degrees.

7. The connector according to claim 1, wherein the ramp runs around at least 50% of a circumference of the male plug-in part.

8. The connector according to claim 1, wherein the ramp has or forms the stop flange for the retainer.

9. The connector according to claim 1, wherein the indicator element is provided on the female plug-in part and passes through an indicator opening in a wall of the female plug-in part.

10. The connector according to claim 9, wherein the indicator element is visible through the indicator opening of the female plug-in part in the properly fixed state.

11. The connector according to claim 9, wherein the indicator element, in the radially outer position, protrudes radially outward from the indicator opening.

12. The connector according to claim 1, wherein a section of the retainer is arranged, in the properly fixed state of the male plug-in part and in the radial outer position of the indicator element, between a protruding section of the indicator element and a flange element protruding from the outer surface of the female plug-in part.

13. The connector according to claim 1, wherein two indicator elements are provided and are expediently provided on the female plug-in part, and each pass through an indicator opening in a wall of the female plug-in part.

14. The connector according to claim 1, wherein the indicator element has at least one indicator foot, with which the indicator element slides on the ramp.

15. A connector according to claim 14, wherein an indicator foot of the indicator element is slanted according to an angle of incline of the ramp.

16. A connector for connecting two fluid-conducting elements with a female plug-in part and a male plug-in part that can be plugged into the female plug-in part in an axial direction, wherein the male plug-in part can be fixed on the female plug-in part via at least one fixing element comprising a retainer configured for connection to the female plug-in part with which the male plug-in part can be fixed in a properly fixed state on the female plug-in part, wherein at least one indicator element is provided, which shows the properly fixed state of the male plug-in part, which has been reached via the fixing element,- on the female plug-in part, wherein an outer surface of the male plug-in part includes a ramp configured such that the indicator element is guided over the ramp and displaced outward in the radial direction when the male plug-in part is inserted into the female plug-in part, and wherein at least one radial outer position of the indicator element indicates the properly fixed state of the male plug-in part on the female plug-in part, the indicator element projecting radially outward from the female plug-in part such that the indicator element is visible to provide optical verification of the properly fixed state, wherein the indicator element passes through an indicator opening in the wall of the female plug-in part, the indicator opening being stepped to define a radial outer portion which is wider than a radial inner portion, and wherein the indicator element includes a cam that is received in the radial outer portion when the indicator element is in the at least one radial outer position, the cam restricting the indicator element from moving back radially inwardly.

17. A connector for connecting two fluid-conducting elements with a female plug-in part and a male plug-in part that can be plugged into the female plug-in part in an axial direction, wherein the male plug-in part can be fixed on the female plug-in part via at least one fixing element comprising a retainer configured for connection to the female plug-in part with which the male plug-in part can be fixed in a properly fixed state on the female plug-in part, wherein at least one indicator element is provided, which shows the properly fixed state of the male plug-in part, which has been reached via the fixing element on the female plug-in part, wherein an outer surface of the male plug-in part includes a ramp configured such that the indicator element is guided over the ramp and displaced outward in the radial direction when the male plug-in part is inserted into the female plug-in part, and wherein at least one radial outer position of the indicator element indicates the properly fixed state of the male plug-in part on the female plug-in part, the indicator element projecting radially outward from the female plug-in part such that the indicator element is visible to provide optical verification of the properly fixed state, wherein the indicator element has two indicator feet which engage and slide on the ramp and wherein the two indicator feet are each connected to an indicator leg of the indicator element.

18. The connector according to claim 17, wherein the two indicator feet are circumferentially spaced apart to engage the ramp at two circumferential points.

19. The connector according to claim 17, wherein the indicator element is a unitary piece and, in the radially outer position, protrudes radially outward from the indicator opening such that the indicator element is visible to provide optical verification of the properly fixed state.

20. The connector according to claim 17, wherein the indicator element passes through an indicator opening in the wall of the female plug-in part, the indicator opening being stepped to define a radial outer portion which is wider than a radial inner portion, and wherein the indicator element includes a cam that is received in the radial outer portion when the indicator element is in the at least one radial outer position, the cam restricting the indicator element from moving back radially inwardly.

* * * * *